Oct. 9, 1956        D. BUCCICONE        2,765,536
THICKNESS GAUGE
Filed March 23, 1955        3 Sheets-Sheet 1
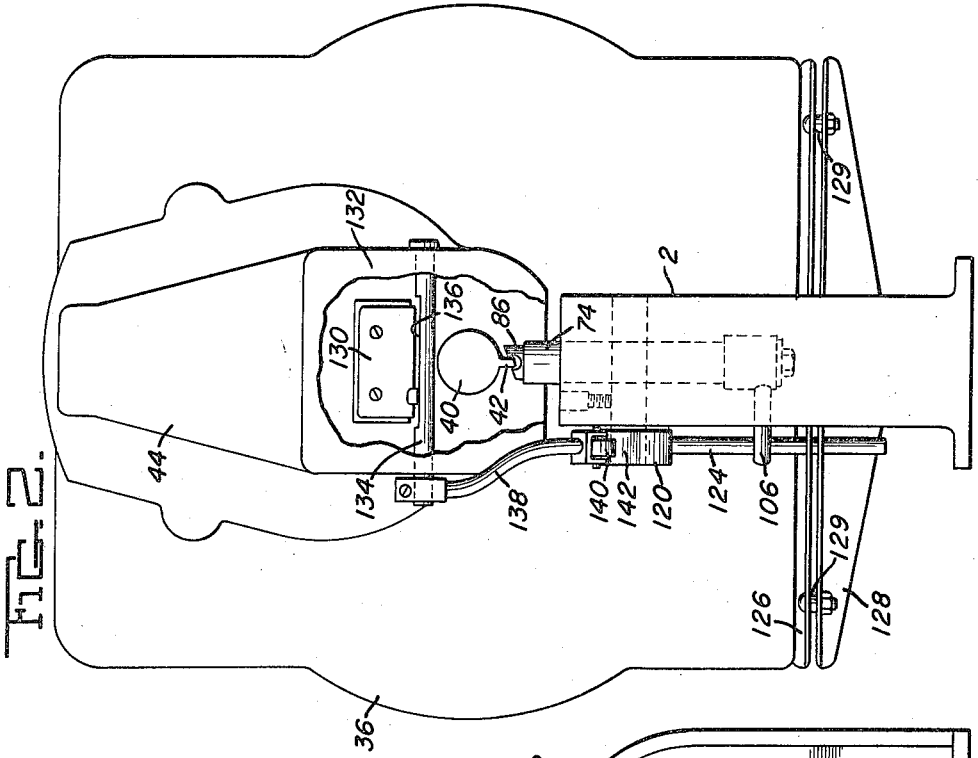
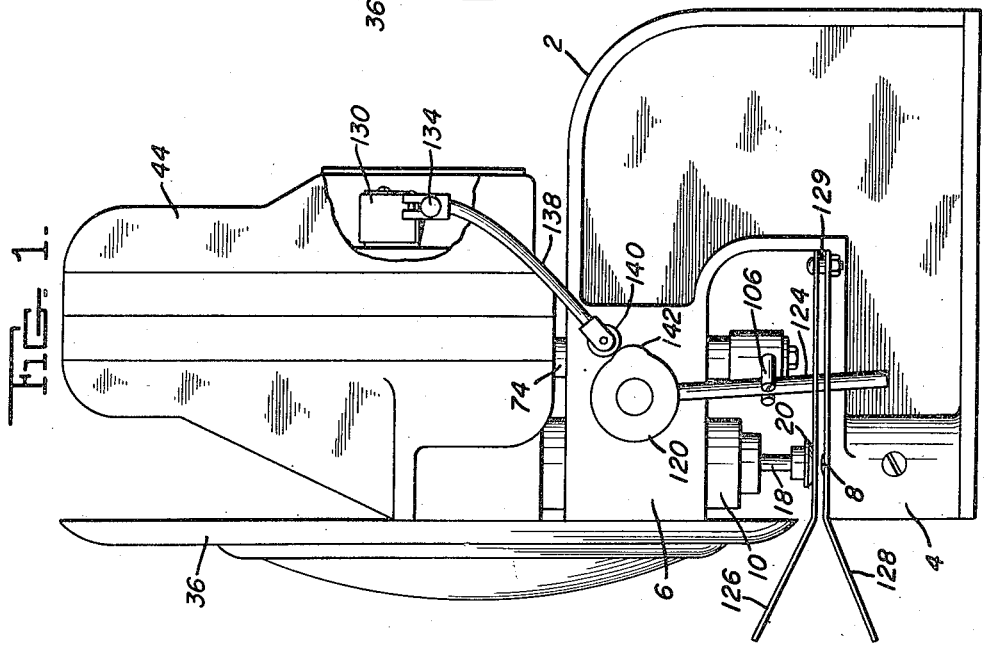
INVENTOR:
DARIO BUCCICONE,
BY: *Robert U. Geib, Jr.*
his Attorney.

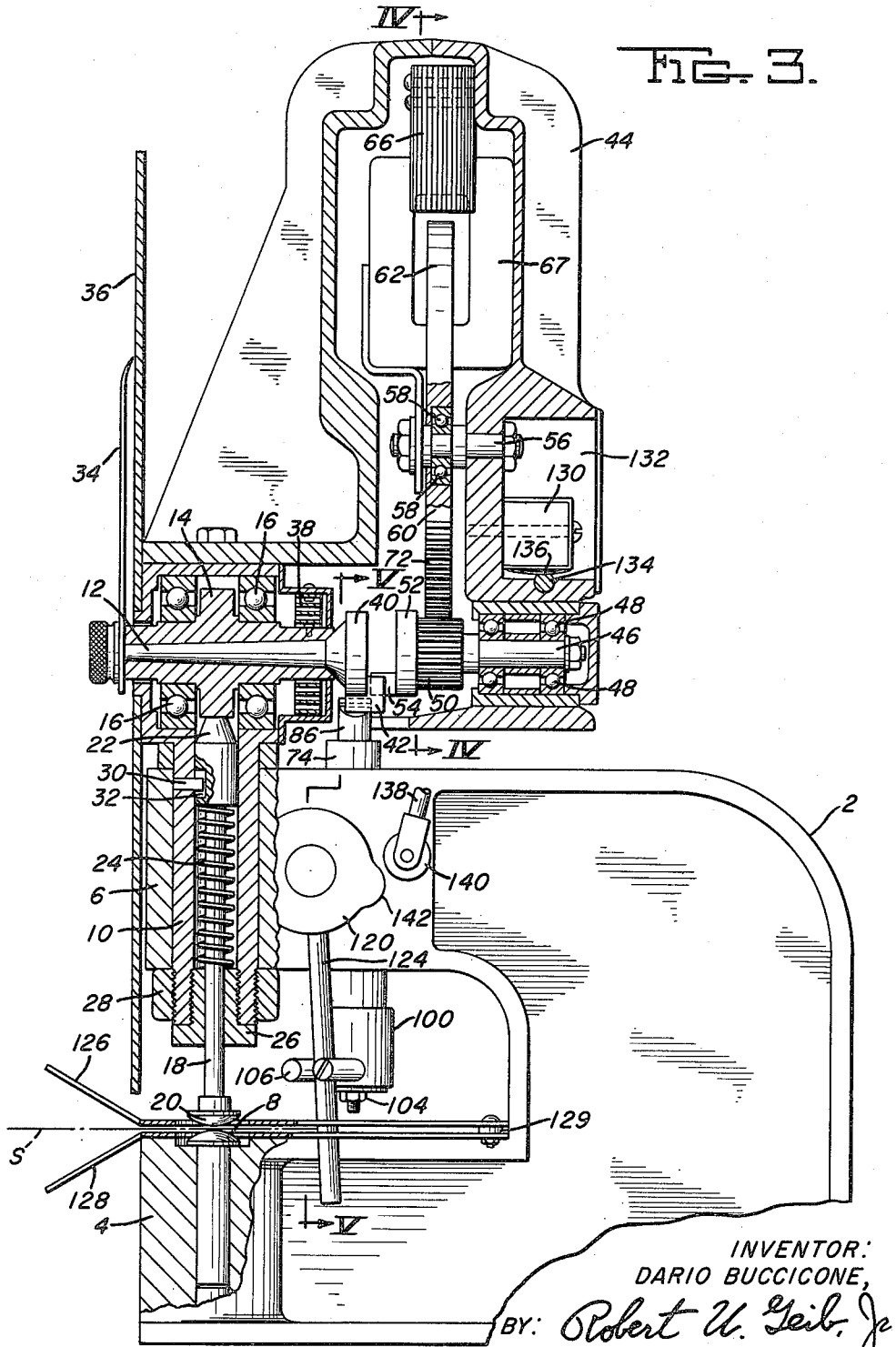

Oct. 9, 1956        D. BUCCICONE        2,765,536
THICKNESS GAUGE
Filed March 23, 1955        3 Sheets-Sheet 3
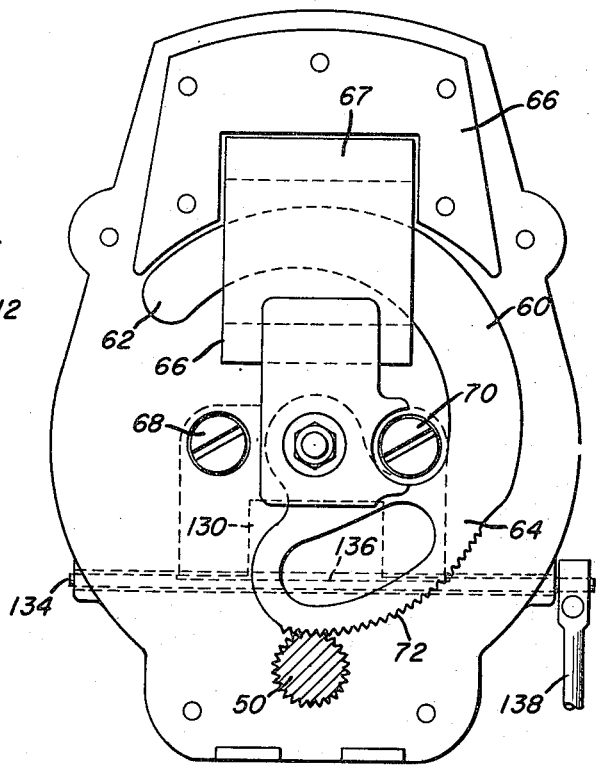
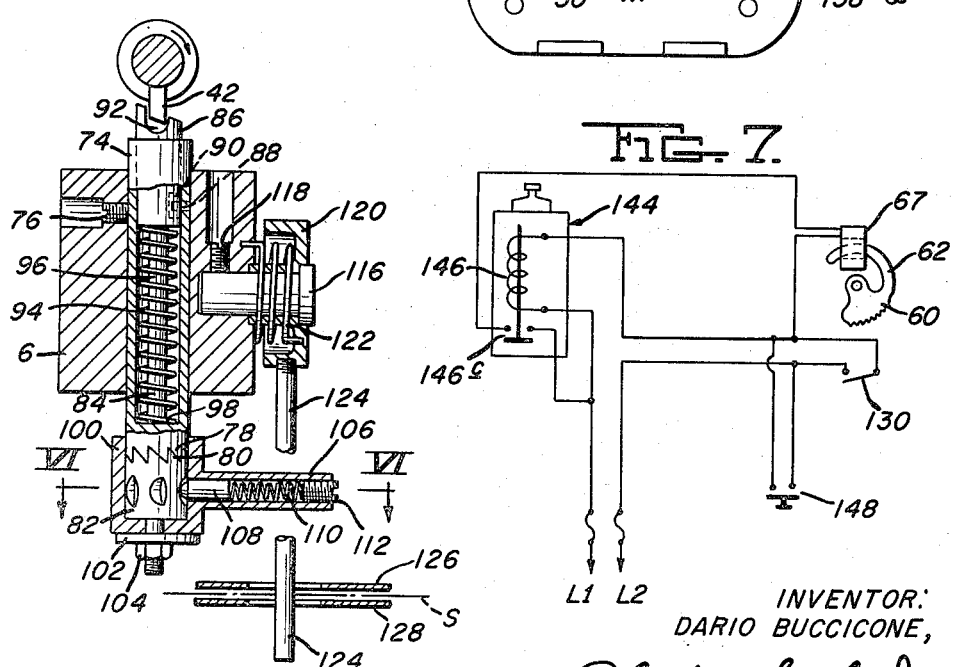
INVENTOR:
DARIO BUCCICONE,
BY: Robert U. Geib, Jr.
his Attorney.

United States Patent Office 2,765,536
Patented Oct. 9, 1956

2,765,536

THICKNESS GAUGE

Dario Buccicone, Gary, Ind.

Application March 23, 1955, Serial No. 496,101

4 Claims. (Cl. 33—147)

This invention relates to a thickness gauge and more particularly to a gauge for determining the thickness of metallic sheets such as shown in my prior Patent No. 2,264,433, dated December 2, 1941. While the gauge shown in my prior patent was satisfactory for many purposes it was relatively complicated and expensive to manufacture. Also, because the cam for the plunger is directly connected to reset gears it was found that the readings on the gauge were not completely accurate or constant when measuring to ten-thousandths of an inch.

It is therefore an object of my invention to provide a thickness gauge which is automatically placed in operation by the material being gauged and which has an improved reset mechanism incorporated therein.

Another object is to provide such a gauge which is simple and inexpensive in construction and which accurately and efficiently gauges the material.

These and other objects will be more apparent after referring to the following specification and attached drawings, in which:

Figure 1 is a side view of my improved gauge;

Figure 2 is a back view of the gauge of Figure 1;

Figure 3 is a longitudinal sectional view of the gauge;

Figure 4 is a view taken on the line IV—IV of Figure 3;

Figure 5 is a view taken on the line V—V of Figure 3;

Figure 6 is a view taken on the line VI—VI of Figure 5; and

Figure 7 is a schematic wiring diagram.

Referring more particularly to the drawings, reference numeral 2 indicates a yoke-shaped frame having a base or lower arm 4 and an upper arm 6. A stationary lower anvil 8 is arranged in the lower arm 4 and a housing 10 is arranged in the upper arm 6 directly above the anvil 8. A cam shaft 12 having a cam 14 secured thereto is horizontally disposed in the housing 10 and is rotatably mounted on bearings 16. A plunger 18 having an upper anvil 20 secured to its lower end in alignment with the anvil 8 is arranged in the lower part of the housing 10. A cam follower 22 is secured to the upper end of plunger 18 and is held in contact against the cam 14 by means of a spring 24 which surrounds the plunger 18 with its upper end bearing against the cam follower 22 and its lower end bearing against a member 26 threaded into the housing 10. The lower end of the housing 10 is threaded to receive a nut 28 which holds it in position in the upper arm 6. A pin 30 secured to the housing 10 extends into a recess 32 in the cam follower 22, thus permitting axial movement of the cam follower while preventing rotation thereof. A pointer 34 is arranged on the outer end of shaft 12 for movement therewith and cooperates with a graduated indicating dial 36 to indicate the thicknesss of the material being gaged. The dial 36 is preferably fixedly mounted on the outer face of housing 10. A spiral spring 38 is arranged around the inner end of shaft 12 with one end being secured to the shaft and the other end to the housing 10. The spring 38 is normally loaded and its purpose is to rotate the shaft 12 and cam 14 to cause the plunger 18 and anvil 20 to move downwardly to engage the sheet S being gauged in a manner to be described hereinafter. The construction and operation of the parts so far described differ in no material detail from the corresponding parts in my above identified patent.

An annular member 40 is integrally secured to the inner end of shaft 12 and has a catch 42 on its outer periphery. The member 40 and catch 42 extend from the housing 10 into a solenoid housing 44 secured to the housing 10 in any suitable manner. A shaft 46 is rotatably mounted in bearings 48 in the housing 44 and is arranged in axial alignment with the shaft 12. A pinion 50 and an annular member 52 are secured to the shaft 46. The member 52 has a catch 54 arranged on its periphery which extends toward the member 40 and cooperates with the catch 42 in a manner to be described hereinafter. A stud shaft 56 having a surrounding bearing 58 is arranged in the housing 44 above the shaft 46. An arcuate-shaped rocking member 60 having an upper solenoid armature portion 62 and a counterweight portion 64 integral therewith is pivotally mounted on the bearing 58. The armature 62 cooperates with a laminated solenoid 66 having a coil 67 which are suitably arranged in the upper part of housing 44 above the shaft 56. The member 60 normally rests against a first stop member or pin 68, but when the solenoid 66 is energized the member 60 moves against a second stop member or pin 70 as shown in Figure 4. The pins 68 and 70 are mounted in the housing 44 and are preferably rubber covered so as to absorb any shock. The rocking member 60 has a series of gear teeth 72 at its lower end which mesh with the teeth of pinion 50.

As best shown in Figures 3 and 5 a vertically disposed sleeve-like housing member 74 is disposed in the upper arm 6 directly below the annular member 40 and is held in place by means of a set screw 76. The lower end of sleeve 74 has serrations or saw teeth 78 therein which cooperate with corresponding teeth 80 arranged on a ratchet member 82 which is rotatably disposed on the lower end of a plunger 84. The plunger 84 has an enlarged upper end portion 86 which slides in the sleeve 74 but is held from rotation by means of a pin 88 secured to the sleeve 74 and extending into an elongated slot 90 in portion 86. The top of portion 86 is arranged at an angle similar to the angle of the bottom of latch 42 and is provided with a notch 92 for receiving the latch 42. A spring 94 surrounds intermediate portion 96 of plunger 84 with one end bearing against upper portion 86 and the other end bearing against a shoulder 98 on the sleeve 74, thus biasing the plunger 84 upwardly at all times. The lower end of plunger 84 extends through a sleeve or casing member 100 which surrounds ratchet member 82. The sleeve 100 is held in place by means of a washer 102 and a nut 104 threaded onto plunger 84. A horizontally disposed forked portion 106 extends outwardly from casing member 100. One leg of the fork 106 has a pawl 108 slidably arranged therein which is urged inwardly by means of a spring 110, the outer end of which bears against a set screw 112. The pawl 108 cooperates with teeth 114 arranged around the periphery of ratchet member 82. A horizontally disposed flanged pin 116 is arranged in the upper arm 6 a short distance to the right of the sleeve 74 and is held from rotation by a set screw 118. A cylindrical housing member 120 is rotatably arranged on the outer end of pin 116. A torsion spring 122 is arranged in housing 120 and has one end secured thereto and the other end secured to the arm 6. A lever 124 is fastened to housing 120 and extends downwardly through the legs of the forked portion 106 and then through both upper and lower guide plates 126 and 128. The guide plates 126 and 128 have flared outer ends to aid in positioning the sheets S to be gauged and suitable openings for anvils 8 and 20 and lever 124. Stops 129 are arranged at the inner end of the guides.

A limit switch 130 is arranged in a housing portion 132 on the back side of housing 44. A horizontal switch operating shaft 134 is rotatably supported in housing 44 directly below switch 130 and is provided with a flat surface 136 which normally contacts the switch 130. A lever arm 138 secured to one end of the shaft 134 extends downwardly to a point adjacent the housing 120 and has a roller 140 on its lower end which cooperates with a cam-like portion 142 arranged on the periphery of member 120.

As shown in Figure 7 current is supplied to the solenoid 66 from power lines L1 and L2 through switch 130 and timing device 144 which is a commercially available device capable of being easily adjusted for functioning over a wide range of time intervals in multiples of one tenth of a second. When switch 130 is closed power is applied to timing coil 146 which after the predetermined time interval will close the contacts 146C, thus completing a circuit to solenoid 66 which then attracts armature 62 to rotate rocking member 60. A switch 148 may be arranged in parallel with switch 130 to enable manual resetting of the gauge.

The operation of my device is as follows:

When there is no sheet in the gauge the anvil 20 will be held in its retracted position by means of the catch 42 engaging in the notch 92 and the switch 130 will be open. When a sheet S is inserted into the gauge it will contact the lever 124 and move it rearwardly. As the lever 124 moves rearwardly it rotates housing member 120, thus loading spring 122 and also causing cam 142 to contact roller 140 which in turn rotates shaft 134 to close switch 130. In the meantime movement of lever 124 rotates ratchet member 82 until the tips of teeth 78 and 80 are in contact some time before the sheet S and lever 124 reach their rearmost positions. The teeth 78 and 80 are in the form of a right triangle as shown so that the teeth gradually move apart and then quickly move together. When the tips of the teeth are in contact the plunger 84 will have moved downwardly against the pressure of spring 94 until the latch 42 is free of the notch 92. When this occurs the cam shaft 12 and cam 14 are free to be rotated by means of the loaded helical spring 38 to force the anvil 20 downwardly against the action of spring 24 to contact the top of sheet S. Movement of shaft 12 also causes pointer 34 to rotate and when the anvil 20 contacts the top of sheet S and holds it against anvil 8 the correct thickness of the sheet is indicated on the dial 36. Continued rearward movement of arm 124 moves ratchet member 82 causing the teeth 78 and 80 to return to their normal position with the plunger 84 moving back to its upper position. However, at this time latch 42 is not in position to be received in notch 92.

Closing of the switch 130 in the manner described above supplies power to solenoid 66 after a predetermined time interval causing rocking member 60 with the gear teeth 72 mounted thereon to rotate. This in turn rotates pinion 50 and catch 54 in a clockwise direction as shown in Figure 4. Catch 54 contacts catch 42 and carries it before it until the beveled lower portion of catch 42 contacts the beveled top of portion 86 and forces the plunger downwardly against the pressure of spring 94, thus permitting the latch 42 to engage in notch 92. At this time the cam shaft 12 and anvil 20 have moved back to their original position with the spring 38 being loaded. This releases the sheet S from its position between anvils 8 and 20 so that the operator with the assistance of the pressure of spring 122 on lever 124 can remove the sheet S from the gauge. Movement of the lever 124 forwardly by pressure of spring 122 also rotates member 120, thus causing cam 142 to rotate arm 138 and open switch 130. This deenergizes solenoid 66 and the rocking member 60 will drop back to its normal position due to the counterbalance 64. Rotation of member 60 rotates pinion 50 through engagement with gear teeth 72, thus bringing the remaining parts back to their original position. The gauge is then ready to receive a new sheet.

While one embodiment of my invention has been shown and described it will be apparent that other adaptations and modifications may be made without departing from the scope of the following claims.

I claim:

1. A gauge for determining the thickness of material comprising an indicating dial, a shaft associated with said dial, means carried by said shaft cooperating with said dial to indicate the thickness of the material, a stationary anvil, a movable anvil aligned with said stationary anvil, means carried by said shaft for actuating said movable anvil, normally loaded resilient means for rotating said shaft, a radial catch mounted on said shaft, a second shaft in alignment with said first shaft, a second radial catch mounted on said second shaft and adapted to engage said first catch, means engaging said first catch for preventing movement of said first shaft, means operable by material in said gauge for moving said last named means to release said first catch to enable said resilient means to move said movable anvil toward said stationary anvil, means operable after a predetermined time to rotate said second shaft to cause said second catch to engage said first catch and move said first shaft back to its normal position, and means for moving said catch engaging means into engagement with said first catch.

2. A gauge for determining the thickness of material comprising an indicating dial, a shaft associated with said dial, means carried by said shaft cooperating with said dial to indicate the thickness of material, a stationary anvil, a movable anvil aligned with said stationary anvil, means carried by said shaft for actuating said movable anvil, normally loaded resilient means for rotating said shaft, a radial catch mounted on said shaft, a second shaft in alignment with said first shaft, a second radial catch mounted on said second shaft and adapted to engage said first catch, a sleeve adjacent said first catch extending in a general radial direction from said first shaft, serrations on said sleeve on the end remote from said first catch, a plunger slidably mounted in said sleeve for movement toward and away from said first catch, said plunger having a notch in the end adjacent said first catch for receiving said first catch, a ratchet member rotatably mounted on the opposite end of said plunger, serrations on said ratchet member in engagment with said first serrations, means normally urging said plunger toward said first catch, an arm pivotally supported adjacent said sleeve extending into position to be engaged by the material being gauged to rotate said ratchet member to release said first catch, means operable after a predetermined time to rotate said second shaft to cause said second catch to engage said first catch and move said first shaft back to its normal position.

3. A gauge for determining the thickness of material comprising an indicating dial, a shaft associated with said dial, means carried by said shaft cooperating with said dial to indicate the thickness of the material, a stationary anvil, a movable anvil aligned with said stationary anvil, means carried by said shaft for actuating said movable anvil, normally loaded resilient means for rotating said shaft, a radial catch mounted on said shaft, a second shaft in alignment with said first shaft, a second radial catch mounted on said second shaft and adapted to engage said first catch, a pinion mounted on said second shaft, a pivotally mounted segmental gear in engagement with said pinion, a solenoid adapted to rotate said segmental gear, a switch for controlling flow of current to said solenoid, a time delay timing device in circuit with said switch, means engaging said first catch for preventing movement of said first shaft, means operable by material in said gauge for moving said last named means to release said first catch to enable said resilient means to move said movable anvil toward said stationary anvil, and means for closing said switch to energize said solenoid and rotate said gear segment to cause said second catch to engage said first catch and move said first shaft back to its normal position.

4. A gauge for determining the thickness of material comprising an indicating dial, a shaft associated with said dial, means carried by said shaft cooperating with said dial to indicate the thickness of the material, a stationary anvil, a movable anvil aligned with said stationary anvil, means carried by said shaft for actuating said movable anvil, normally loaded resilient means for rotating said shaft, a radial catch mounted on said shaft, a second shaft in alignment with said first shaft, a second radial catch mounted on said second shaft and adapted to engage said first catch, a pinion mounted on said second shaft, a pivotally mounted segmental gear in engagement with said pinion, a solenoid adapted to rotate said segmetal gear, a switch for controlling flow of current to said solenoid, a time delay timing device in circuit with said switch, a sleeve adjacent said first catch, serrations in said sleeve on the end remote from said first catch extending in a general radial direction from said first shaft, a plunger slidably mounted in said sleeve for movement toward and away from said first catch, said plunger having a notch in the end adjacent said first catch for receiving said first catch, a ratchet member rotatably mounted on the opposite end of said plunger, serrations on said ratchet member in engagement with said first serrations, means normally urging said plunger toward said first catch, an arm pivotally supported adjacent said sleeve extending into position to be engaged by the material being gauged, resilient means for rotating said arm, a cam movable by said arm, means actuated by said cam for controlling operation of said switch, and means on said ratchet member engaging said arm to rotate said ratchet, movement of said arm by engagement of said material releasing said first catch to permit movement of said movable anvil toward said stationary anvil by means of said first named resilient means, movement of said arm also closing said switch and retracting said plunger, continued movement of said arm releasing said plunger, said time delay device completing a circuit to energize said solenoid to rotate said gear segment to cause said second catch to engage said first catch and move said first shaft back to its normal position.

No references cited.